US012149011B2

(12) United States Patent
Glybovski et al.

(10) Patent No.: US 12,149,011 B2
(45) Date of Patent: Nov. 19, 2024

(54) DUAL-FED PATCH ANTENNA WITH ISOLATED PORTS

(71) Applicant: Topcon Positioning Systems, Inc., Livermore, CA (US)

(72) Inventors: Stanislav Borisovich Glybovski, St. Petersburg (RU); Dmitry Vitalievich Tatarnikov, Moscow (RU); Valeria Vladimirovna Gress, Temryuk (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 0 days.

(21) Appl. No.: 17/800,270

(22) PCT Filed: Jan. 14, 2022

(86) PCT No.: PCT/RU2022/000012
§ 371 (c)(1),
(2) Date: Aug. 17, 2022

(87) PCT Pub. No.: WO2023/136742
PCT Pub. Date: Jul. 20, 2023

(65) Prior Publication Data
US 2024/0297439 A1 Sep. 5, 2024

(51) Int. Cl.
*H01Q 9/04* (2006.01)
*H01Q 1/48* (2006.01)

(52) U.S. Cl.
CPC ............ *H01Q 9/0421* (2013.01); *H01Q 1/48* (2013.01); *H01Q 9/0442* (2013.01); *H01Q 9/045* (2013.01)

(58) Field of Classification Search
CPC ...... H01Q 9/0421; H01Q 1/48; H01Q 9/0442; H01Q 9/045; H01Q 1/52; H01Q 1/521; H01Q 1/523; H01Q 9/0407–0478
See application file for complete search history.

(56) References Cited

U.S. PATENT DOCUMENTS

2008/0204347 A1 8/2008 Alvey et al.
2019/0334235 A1 10/2019 Yoon et al.

OTHER PUBLICATIONS

Godaymi (Multi-Forked Microstrip Patch for Broadband Application. Journal of Physics: Conference Series, vol. 1294 (Year: 2019).*
(Continued)

*Primary Examiner* — Henry Luong
(74) *Attorney, Agent, or Firm* — Bardmesser Law Group

(57) ABSTRACT

Dual-fed antenna includes a ground plane; first and second metal patch radiators positioned over the ground plane, the first and second metal patch radiators are mirror images of each other; the first and second metal patch radiators separated by a meander-shaped gap, thereby forming an interdigitated structure, with each radiator having at least three digits; each digit shorted to the ground plane using a corresponding metal pin; each radiator having a coaxial feed implemented as a connector connected to it through the ground plane, or an aperture-coupled feed. Matching networks can be connected to the coaxial feeds at both ports or to microstrip lines connected to the slots of the aperture-coupled feeds. Each radiator can have tuning pins on an opposite side of the radiator from the digits, where each tuning pin can have a capacitive load. A dielectric plate can be placed between the radiators and the ground plane.

28 Claims, 14 Drawing Sheets

(56) References Cited

OTHER PUBLICATIONS

Search Report in PCT/RU2022/000012, dated Oct. 6, 2022.
Godaymi Wa'il A et al., Multi-Forked Microstrip Patch Antenna for Broadband Application, Journal of Physics: Conference Series, vol. 1294, 2019.
Kumar Dass Tanmaya et al., Design of a meandered line microstrip antenna with a slotted ground plane for RFID applications, AEU—International Journal of Electronics and Communications, vol. 118, May 2020, 153130.
Zhang Aofang et al., High-Isolated Coupling-Grounded Patch Antenna Pair with Shared Radiator for the Application of 5G Mobile Terminals, EEE Transactions on Antennas and Propagation, Jan. 2022.

* cited by examiner

DUAL-FED PATCH ANTENNA WITH ISOLATED PORTS

BACKGROUND OF THE INVENTION

Field of the Invention

The present invention relates to antennas, in particular, to diversity patch antennas used in microwave wireless communications systems.

Description of the Related Art

Patch antennas are used in a variety of radiofrequency systems, where typically a radiation pattern is to be created mainly in a single hemisphere. They are widely applied in ground satellite navigation systems (GPS, GLONASS, Galileo, etc.) and wireless communication systems (WLAN, 3G, LTE, etc.). Patch antennas usually have a microstrip (patch) resonator made of a metal plate of a certain shape raised over a metal ground plane. The resonator in most cases is fed by a single port which excites one selected eigenmode of the resonator, which determines the radiation pattern shape. However, there have been dual-fed patch antennas, in which two separate ports excite two orthogonal modes of the resonator or a combination of eigenmodes while being isolated from each other.

Dual-feed antennas are required to provide two radiation patterns of different shapes at the same frequency. For instance, this property of radiation pattern diversity can be useful to organize the reception of signals from multipath environments by two isolated receivers. In particular, dual-fed patch antennas are highly important when used in compact handsets supporting communication standards with antenna diversity and MIMO (multiple input multiple output) technology. Mutual coupling between antennas operating at the same frequency causes inconvenience for engineers in tuning and matching of both antennas. Moreover, in wireless communication systems, mutual coupling between antennas deteriorates their receive performance in the diversity operation regime. Mutual coupling may result in lower signal-to-noise ratio due to lower received signals and higher noise correlation.

Providing sufficient isolation between the ports, a level of isolation that is typically prescribed by the application, is one of the difficulties in designing a dual-fed patch antenna. In applications of antennas with diversity and MIMO, for instance, in antennas for LTE handsets, it is desirable to achieve the isolation of better than −15 dB between the antenna ports. However, this task becomes challenging if both antennas have omnidirectional patterns and the same polarization and, at the same time are accommodated within a compact embodiment.

Patch antennas have the benefits of low profile and simple integration with electronics thanks to their printed-circuit board implementation. A patch antenna is typically composed of a thin metal plate (the patch) raised above a ground plane, which is a larger parallel metal plate. The patch can be of a rectangular, square, circular, elliptical, polygonal or other shape, with the rectangular shape being the most common. A dielectric slab can be placed between the patch and the ground for miniaturization. A method of tuning is known, in which a patch antenna is tuned to the operational frequency by changing the dielectric permittivity of the slab (Constantine A. Balanis, *Antenna Theory: Analysis and Design,* 2nd Edition, New York: J. Wiley & Sons, 1997, chapter 14). Alternatively, an array of capacitive loads can be introduced that connects the edge of the patch to the ground plane with elements implemented as lumped capacitors or structural capacitance between metal teeth (Leick, Rapoport, Tatarnikov, *GPS Satellite Surveying*, the 4-th Ed., Wiley, 2015, chapter 9.7.1, appendix H). The resonant cavity produced by the patch and the ground plane is commonly fed by a coaxial probe connected to the patch or by a slot in the ground plane driven with a microstrip transmission line. In both cases, the feed position relative to the patch is adjusted to obtain impedance matching.

The patch and the ground plane can be separate metal plates or can be printed on both sides of the same dielectric substrate using printed-circuit board technology. In this case, the substrate can play the role of the dielectric slab and its dielectric permittivity affects the resonant frequency.

A dual-fed antenna with diversity can be built of two identical compactly spaced patch antennas as follows. Two closely spaced patches placed above the same ground plane form a system of coupled resonators. For symmetric coupled antenna, the mutual coupling effect can be analyzed and solved using mode-cancellation method, based on the proper excitation of common mode (CM) and differential mode (DM) of two coupled resonators (*IEEE Transactions on Antennas and Propagation*, vol. 68, no. 5, pp. 3423-3432 (2020)). When the amplitudes of CM and DM, excited by the active port in the first antenna, are the same, the mutual coupling effect between two separated antennas can be totally eliminated due to field superposition. As a result, the signal induced in the passive port of the second antenna is suppressed.

The known mode-cancellation methods propose some isolating structure to be placed symmetrically near two identical coupled patch antennas. The isolating structure, depending on its symmetry, can affect only the common or the differential mode. By adjusting one of the parameters of the structure, the two modes can be tuned to the same frequency and then excited with the same magnitudes by choosing the feed position. Known practical implementations of mode decoupling structures include the following. In *IEEE Transactions on Antennas and Propagation*, vol. 69, no. 6, pp. 3074-3083 (2021), a decoupling scheme is proposed to reduce the strong mutual coupling between extremely closely spaced patch antennas by inserting a lumped inductance or an inductive connecting strip as the decoupling structure. The same method is applied to antennas of other types. In *IEEE Transactions on Antennas and Propagation*, vol. 69, no. 2, pp. 672-682 (2021) by inserting the decoupling structure composed of two horizontal strips and a capacitively loaded vertical strip, the strong mutual coupling between two dipoles can be suppressed. In *IEEE Antennas and Wireless Propagation Letters*, vol. 18, no. 7, pp. 1367-1371 (2019), good isolation was obtained by adjusting the length of a decoupling structure formed by a common ground branch between two identical U-shaped antenna elements.

The disadvantage of the above-discussed decoupling methods is in doubling the size of the dual-fed antenna compared to the size of the single patch. Indeed, in the literature, two full-sized patches or other antennas are combined before canceling the mutual coupling. However, for the purposes of miniaturization and integration, it is advantageous to obtain a dual-fed patch antenna with the size of the single-fed one.

In contrast to the conventional art, the dual-fed patch antenna proposed in the present invention has two ports that share the same patch resonator. The patch is split into two halves by cutting a capacitive gap in between, while each half has a number of discrete pins shorting their edges to the ground plane nearby the split. The pins shorting the neighboring half-patches introduce additional inductive coupling, while the gap itself introduces capacitive coupling between the half-patches. Therefore, the mode-decoupling method becomes possible to apply to two identical half-size antennas (each one is a resonator formed by one of the half-patches shorted by pins to the ground). With two decoupled ports the proposed antenna for each of two ports operates in the same bandwidth as a single half-sized patch and is suitable for diversity operation. Decoupling of two halves of the same patch antenna could be conventionally achieved by placing between them a mirror-symmetric metal shield, which, however, makes the antenna relatively high. In contrast, the proposed decoupling structure does not increase the height of the dual-fed antenna.

The proposed technical solution solves the problem of mutual coupling reduction in combined dual-feed omnidirectional antennas operating at one frequency and composed of two halves of a patch radiator without increasing its height.

SUMMARY OF THE INVENTION

A dual-fed patch antenna with high isolation of ports is proposed, including two half-sized metal plates (for example, rectangular or semi-circular) separated by a capacitive gap, thereby forming an interdigitated structure and both shorted to the common ground plane with an array of discrete pins. The above-described patch radiator with two feeds is connected to an electronic circuit through a matching network at each of the two ports. Each port excites its own half-sized resonator including a half-sized metal plate shorted by multiple pins to the ground. The two ports are decoupled thanks to the decoupling structure represented by a capacitive meander-shaped gap between the two metal plates, and by two parallel periodic linear arrays of shorting pins. The decoupling structure is arranged in a way that there is a mutual shift (positive or negative) of the parallel linear arrays of shorting pins in the direction perpendicular to the direction of both linear arrays, which is responsible for the frequency of decoupling. This shift is in the direction parallel to E-plane of the antenna. Moreover, there is a half-period shift of one linear array against the other along the direction of both linear arrays (in parallel to the H-plane of the antenna). Another parameter responsible for the isolation level at the decoupling frequency is the width of the capacitive gap between the half-sized metal plates.

The proposed decoupling method can be applied to patch antennas with various patch shapes such as rectangular, circular, diamond or other shapes known by those who are skilled in the art. In each case, the patch is split into two half-size plates by a capacitive meander-shaped gap, while the two ports are decoupled thanks to the decoupling structure represented by the gap and two parallel periodic linear arrays of shorting pins that are shifted in space relative to each other.

The half-sized plates are, as one option, printed using printed circuit board (PCB) technology as flat metal sheets of the shape produced by cutting a meandered gap from a full-sized patch. Two examples are described here with the most common patch shapes, i.e., rectangular and circular. The PCB with two half-sized plates is placed parallel to the ground plane and both plates are connected with a periodic linear array of shorting pins to the ground plane nearby the capacitive gap. The two resonators can be tuned to the operational frequency by connecting the half-sized plates to the ground plane with a set of periodically arranged capacitive loads distributed along with the radiative slots of the patch antenna. The loads can be conveniently represented as capacitive strips printed on the same PCB as for the half-sized metal plates but on the opposite side of the dielectric substrate. Each strip reproduces structural capacitance, through which the plates are connected to the ground with individual tuning pins for reduction of the resonant frequency. The half-sized plates and the capacitive strips are printed together on the same (upper) PCB. The ground plane is, as one option, printed on a separate (lower) PCB. The height of the upper PCB above the lower PCB determines the relative bandwidth of the antenna. Optionally, a non-conductive dielectric, such as glass or epoxy, could be placed between the PCBs, with pins going through the dielectric. Alternatively to using PCBs, the half-sized plates and the ground plane can be cut from a thin metal shield.

At the first design step, both half-sized shorted resonators are tuned to the target operational frequency by varying the dielectric permittivity of the slab dielectric slab or the equivalent dielectric constant due to the capacitive loads. The equivalent permittivity can be adjusted, for example by changing the capacitance of the capacitive loads at the radiative slots of the patch antenna, as is known in the art. The resonators can be excited by probe feeds (vertical metal pins) that are connected to an electronic circuit directly or through a matching network using coaxial or microstrip transmission lines. An alternative feeding method for the two half-sized resonators uses an aperture slot feed.

At the second design step, both feeds should be impedance-matched using approaches known in the art, for instance, by varying the position of each probe relative to radiative slots or by applying additional matching networks comprising single lumped elements or L-, Pi-, T-type circuits, or corresponding stubs, or impedance transformers (distributed circuits).

At the third design step, a decoupling structure represented by a capacitive meander-shaped gap between two metal plates, and by two parallel periodic linear arrays of shorting pins is adjusted to obtain high isolation between the ports at the target operational frequency. The parameter responsible for the frequency of decoupling is the shift between the positions of the two linear arrays of shorting pins in the direction perpendicular to both linear arrays (parallel to E-plane of the antenna). The pins from one linear array also have a half-period shift with respect to the pins of the other linear array in the direction of both linear arrays (parallel to H-plane of the antenna). Therefore, the E-plane shift of the linear arrays can be positive or negative (zero shift corresponds to axes of both linear arrays aligned). The optimal E-plane shift that provides the minimum of mutual coupling at the operational frequency is to be determined via numerical simulation using methods known in the art. The isolation level achievable at the decoupling frequency is determined by the second parameter of the decoupling structure, i.e., the width of the meandered capacitive gap between the half-sized plates of the patch antenna. After the tuning, matching, and decoupling steps, the dual-fed patch antenna will operate at the same frequency and with the same bandwidth creating two different radiation patterns related to two decoupled ports. The patterns are mirror-symmetric with respect to each other and their shapes have minor differences from the radiation pattern of a single half-sized shorted patch over the same ground plane.

The obtained decoupling improvement in the proposed invention is achieved thanks to mode cancellation of the two half-sized resonators. By setting the optimal E-plane mutual shift of two linear arrays of shorting pins as well as the width of the capacitive meandered gap between half-sized plates, one makes the capacitive and inductive coupling between the half-sized shorted resonators cancel each other. This regime corresponds to the condition in which CM (common mode) and DM (differential mode) resonate at the same frequency and are excited with the same magnitude.

Additional features and advantages of the invention will be set forth in the description that follows, and in part will be apparent from the description, or may be learned by practice of the invention. The advantages of the invention will be implemented and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and, together with the description, serve to explain the principles of the invention.

Figure 12:
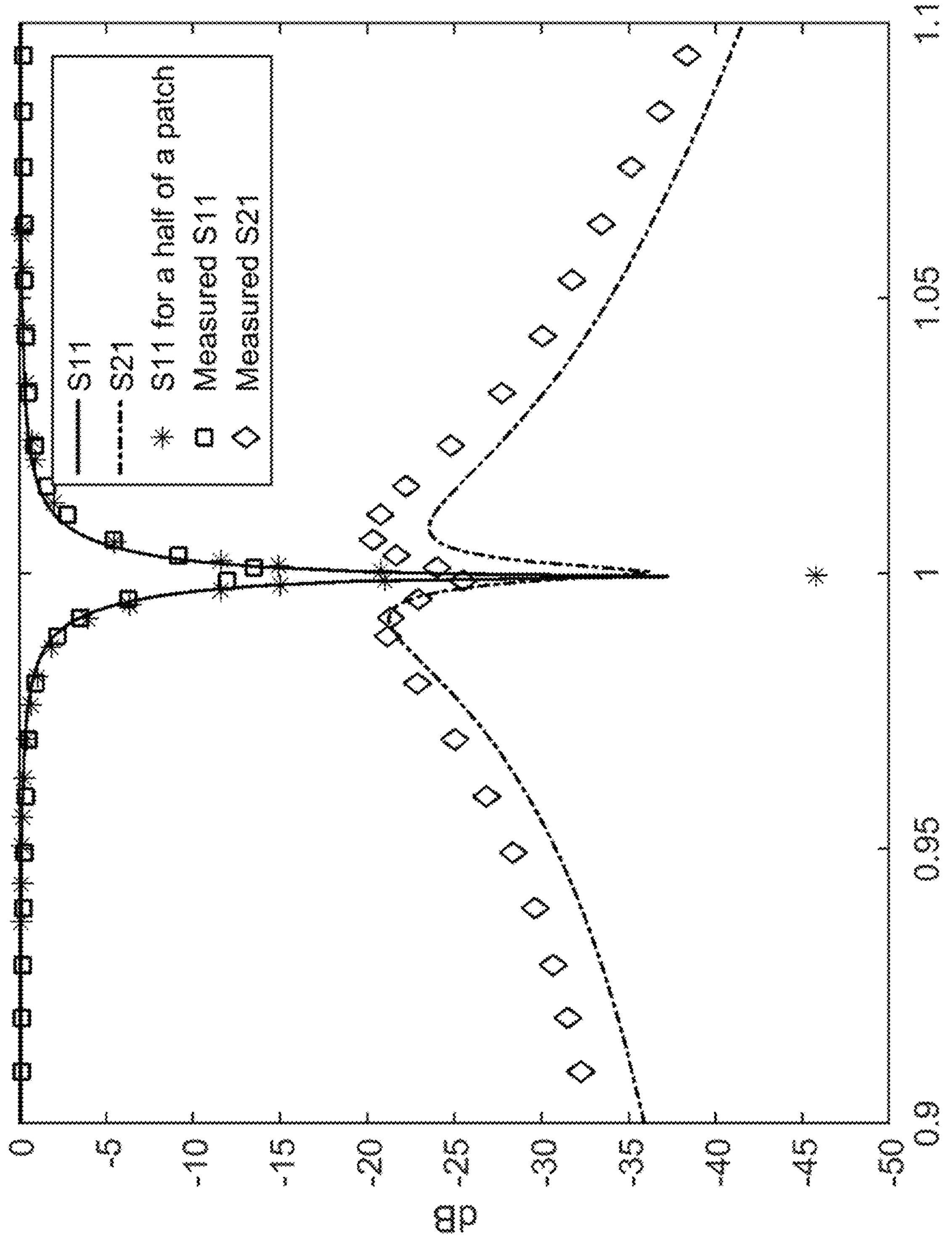

FIG. 12 shows an example of calculated S-parameters for the dual-feed rectangular patch antenna with a height of 10 mm, where both half-sized resonators are tuned to the frequency $f_0$=800 MHZ compared to measured S-parameters of the corresponding experimentally realized antenna. The same figure shows calculated S-parameter (reflection coefficient) of the corresponding single-fed half sized shorted rectangular patch antenna (without the second half) tuned and matched at the same frequency $f_0$=800 MHZ.

Figure 13:
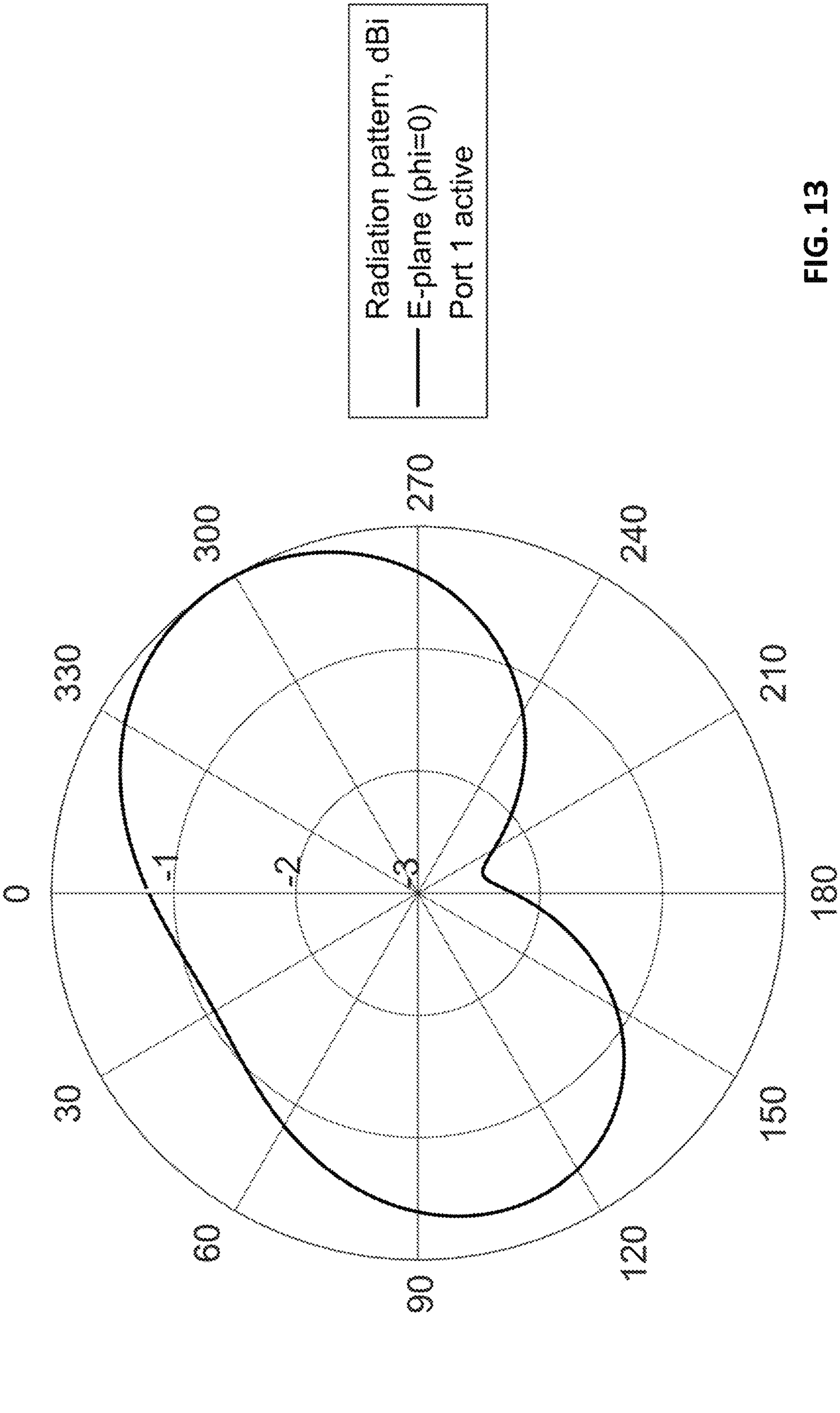
Figure 14:
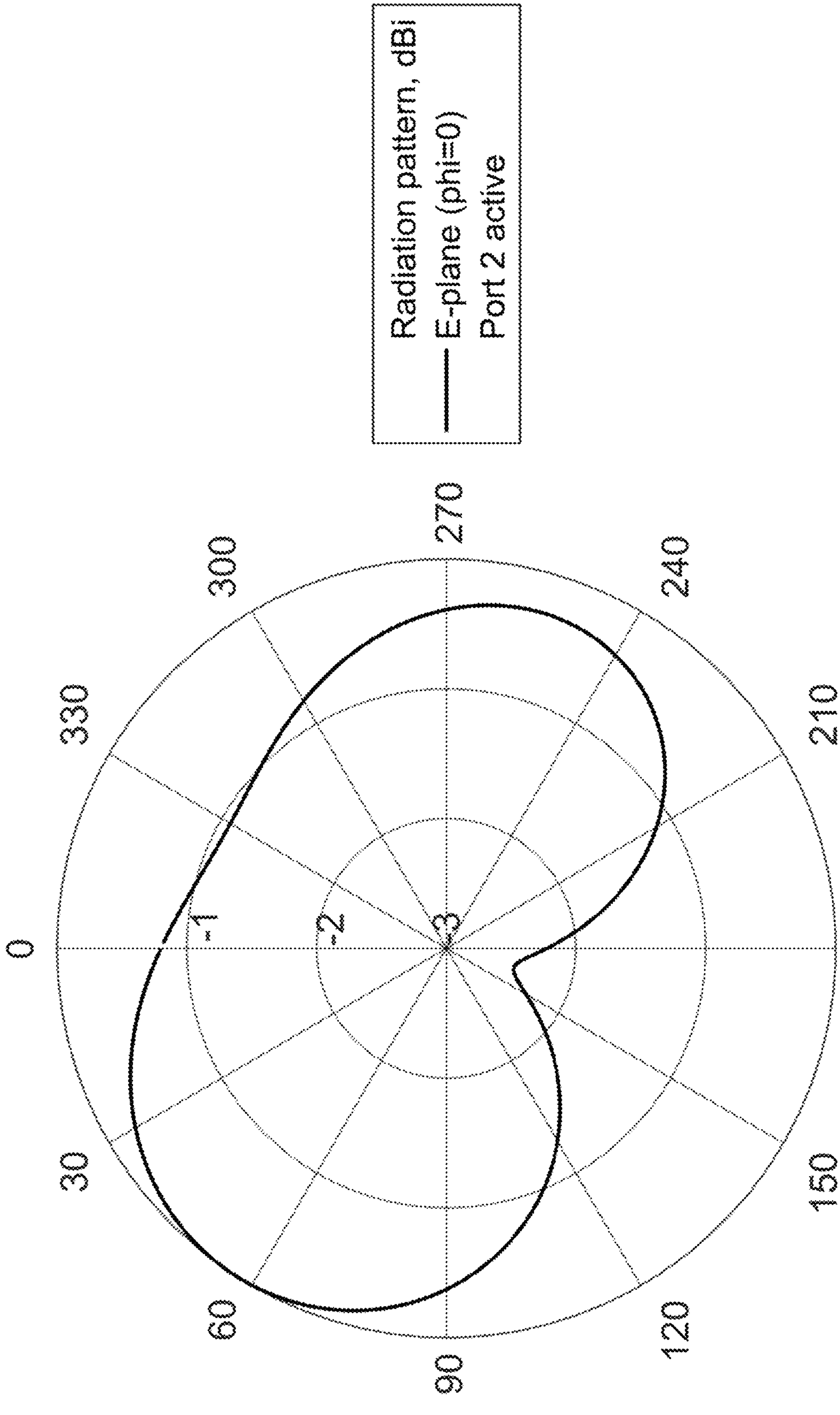

FIGS. 13-14 show the calculated radiation patterns (directivity in dBi) in the E-plane of the rectangular antenna (XZ-plane) with a height of 10 mm for the variant with two coaxial feeds at the operational frequency of 800 MHZ (LTE downlink band 20).

Figure 15:
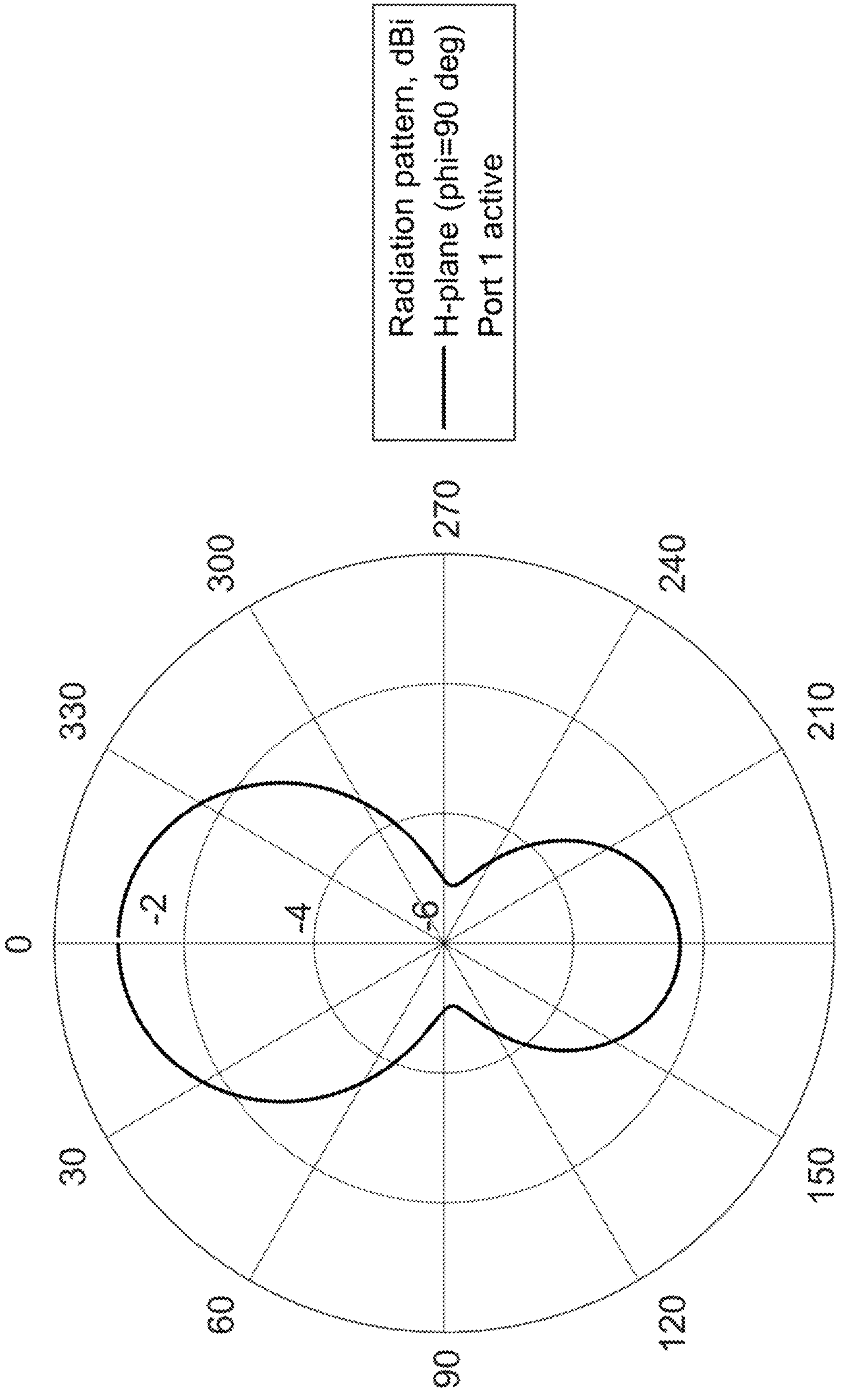

FIG. 15 shows the calculated radiation pattern (directivity in dBi) in the H-plane of the rectangular antenna (YZ-plane) for the variant with two coaxial feeds at the operational frequency of 800 MHZ (LTE downlink band 20).

Figure 16:
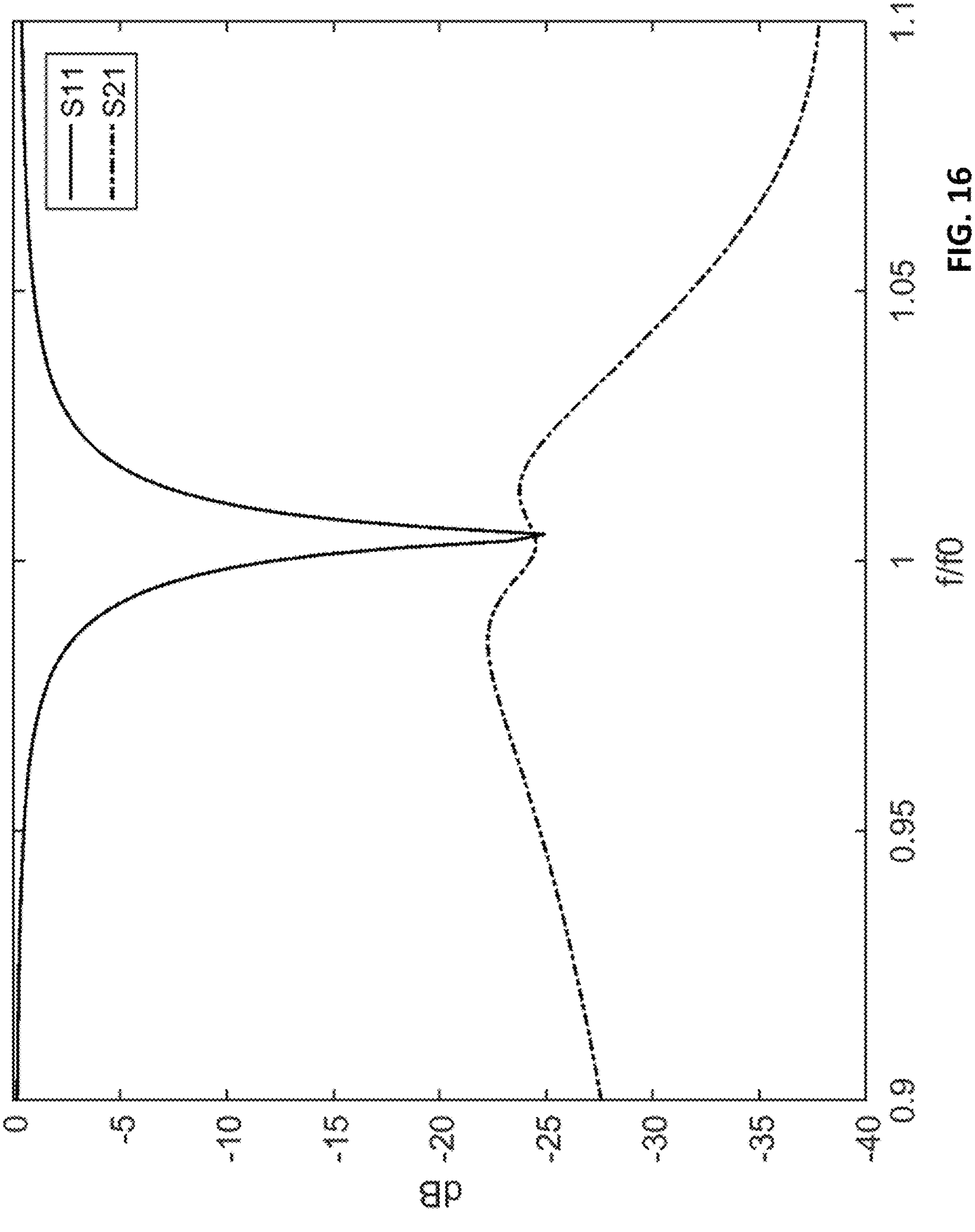

FIG. 16 shows an example of calculated S-parameters for the dual-feed rectangular patch antenna with the increased height of 20 mm, where both half-sized resonators are tuned to the frequency $f_0$=800 MHZ.

Figure 17:
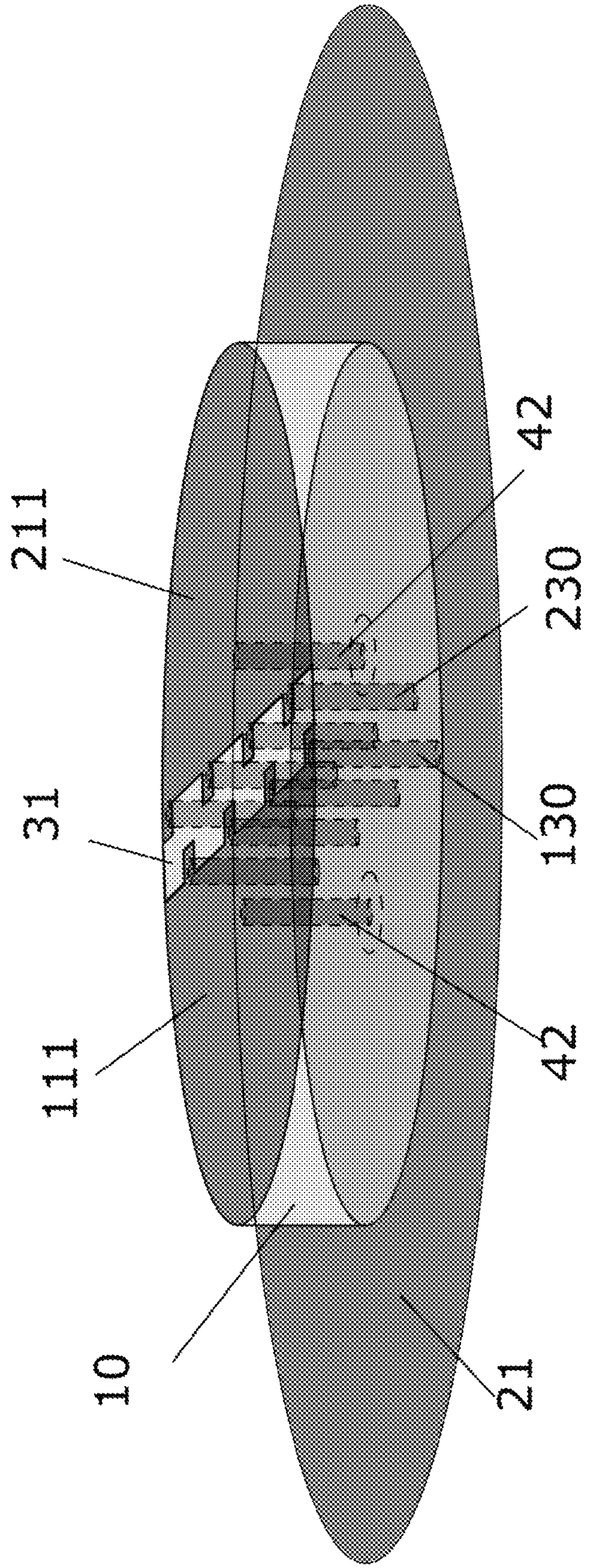

FIG. 17 shows a general view of a variant of the dual-fed patch antenna with radiators of semi-circular shapes over a dielectric substrate and two coaxial feeds.

Figure 18:
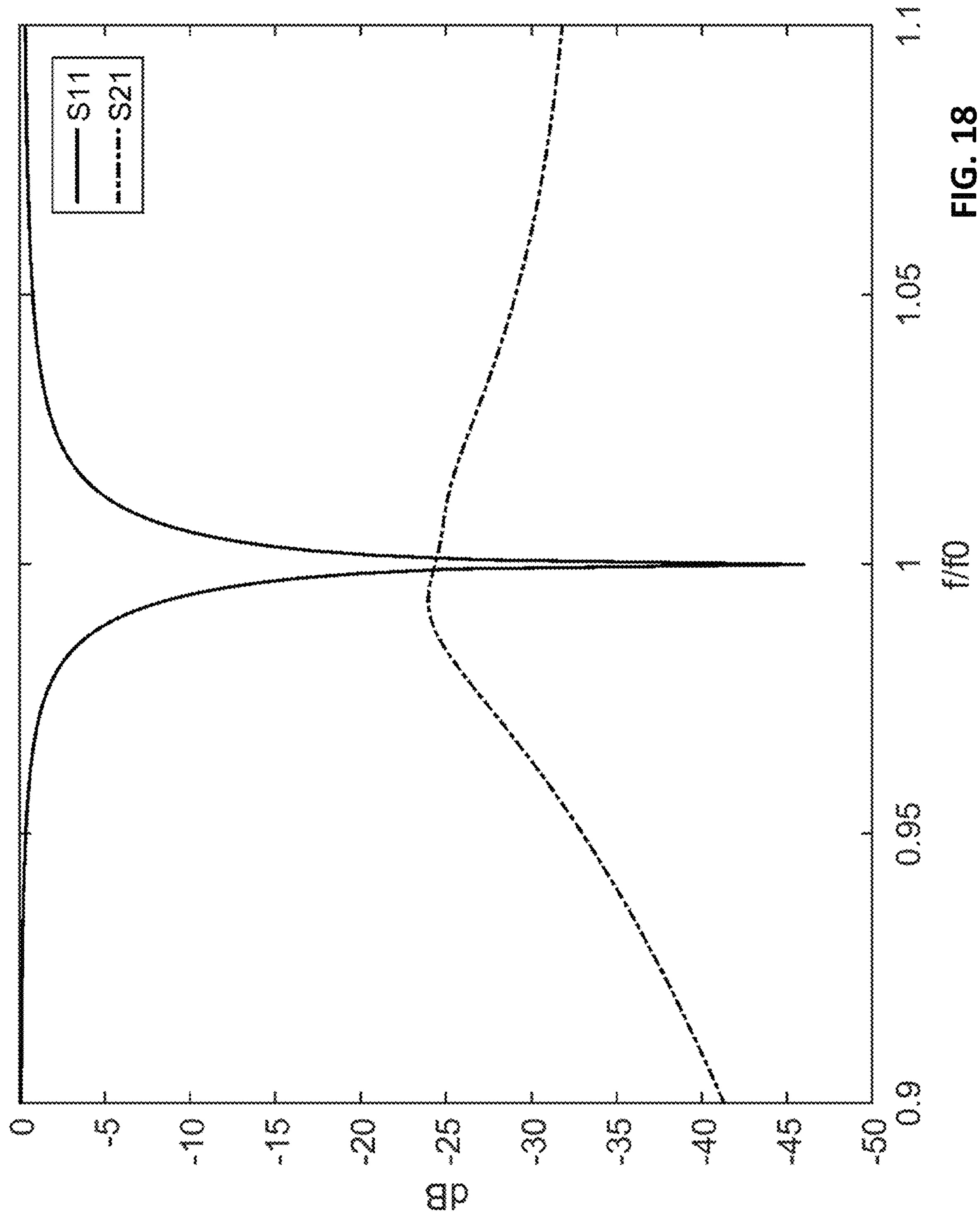

FIG. 18 shows an example of calculated S-parameters for the circular dual-feed patch antenna on a dielectric substrate, where both half-sized resonators are tuned to the frequency $f_0$=2.4 GHZ (one of Wi-Fi bands).

DETAILED DESCRIPTION OF EMBODIMENTS OF THE INVENTION

Reference will now be made in detail to the embodiments of the present invention, examples of which are illustrated in the accompanying drawings.

Figure 1:
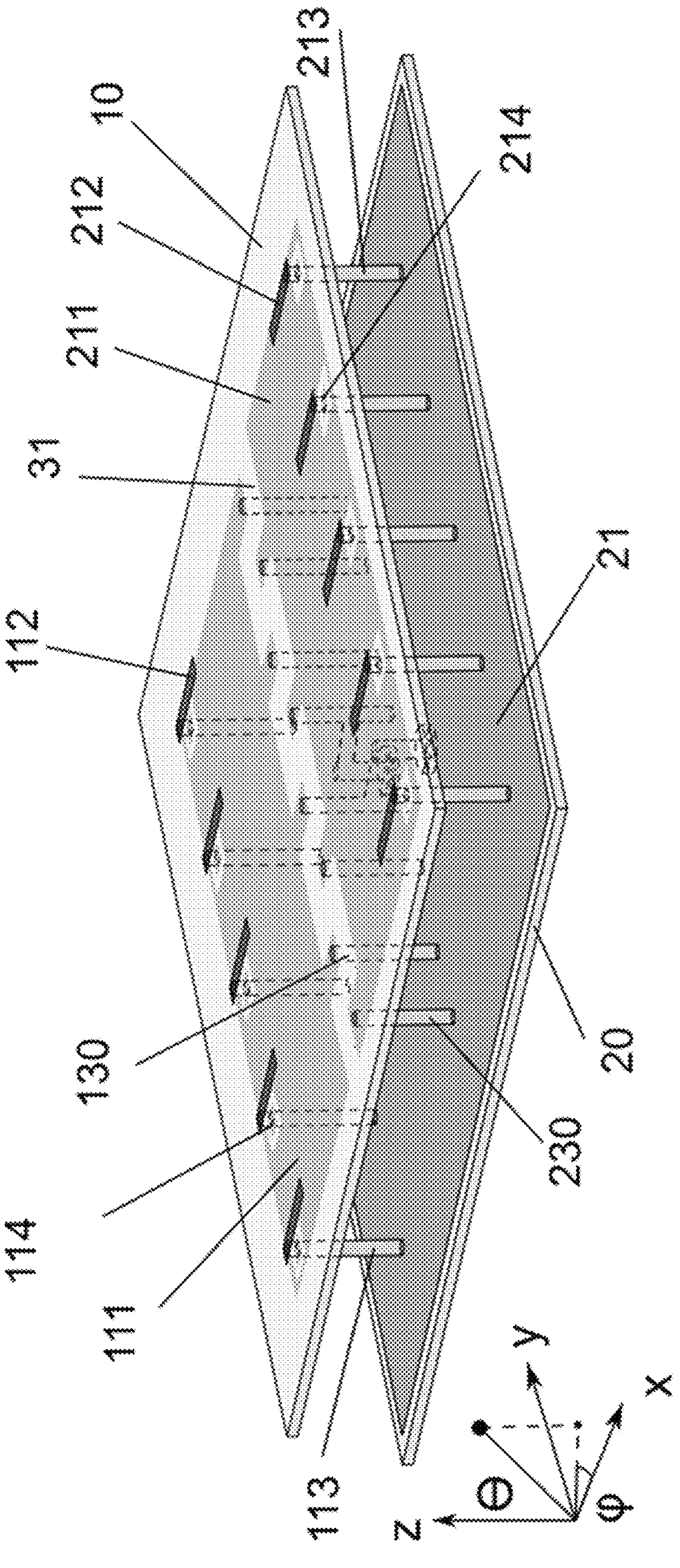
FIGS. 1-2 show a general view of a variant of the dual-fed rectangular patch antenna with capacitive loads and two coaxial feeds.
Figure 2:
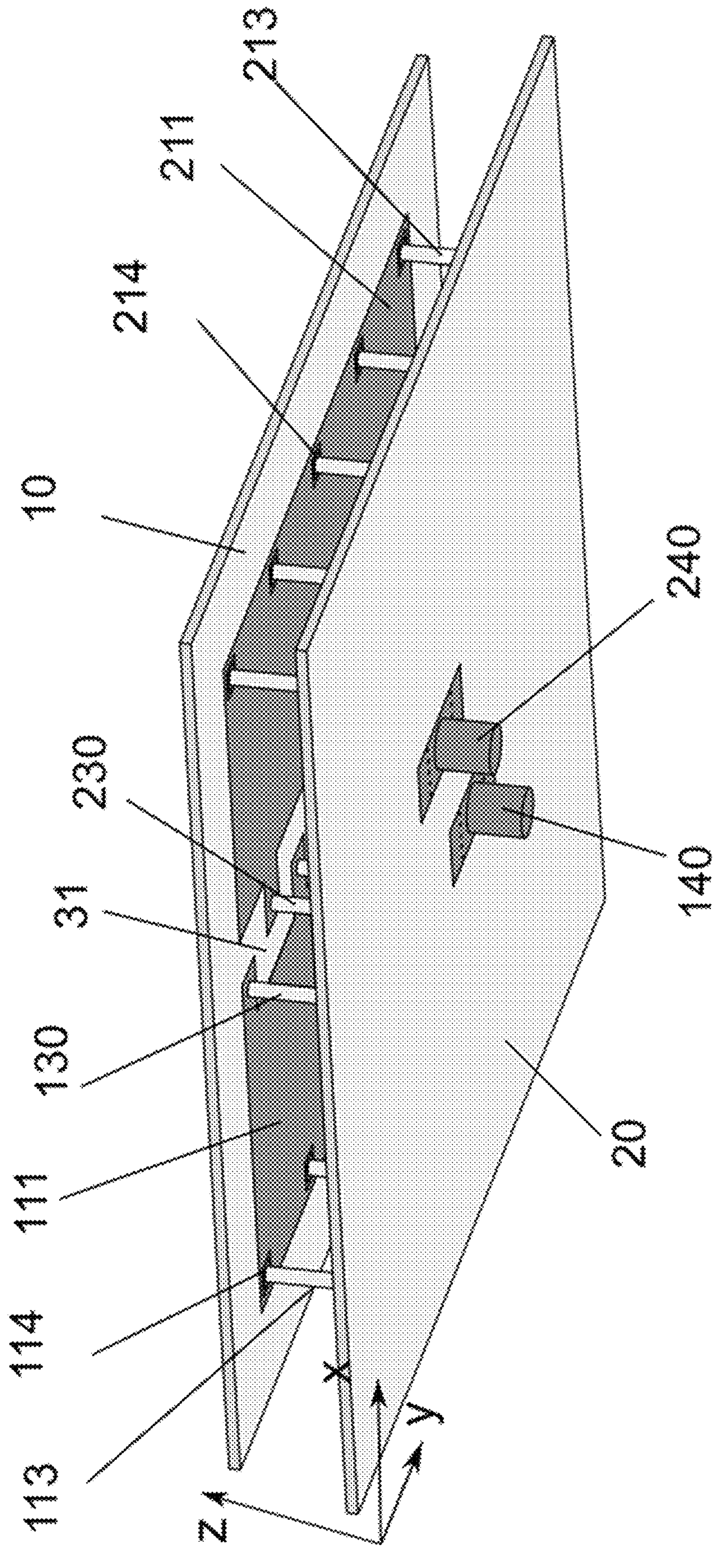
Figure 3:
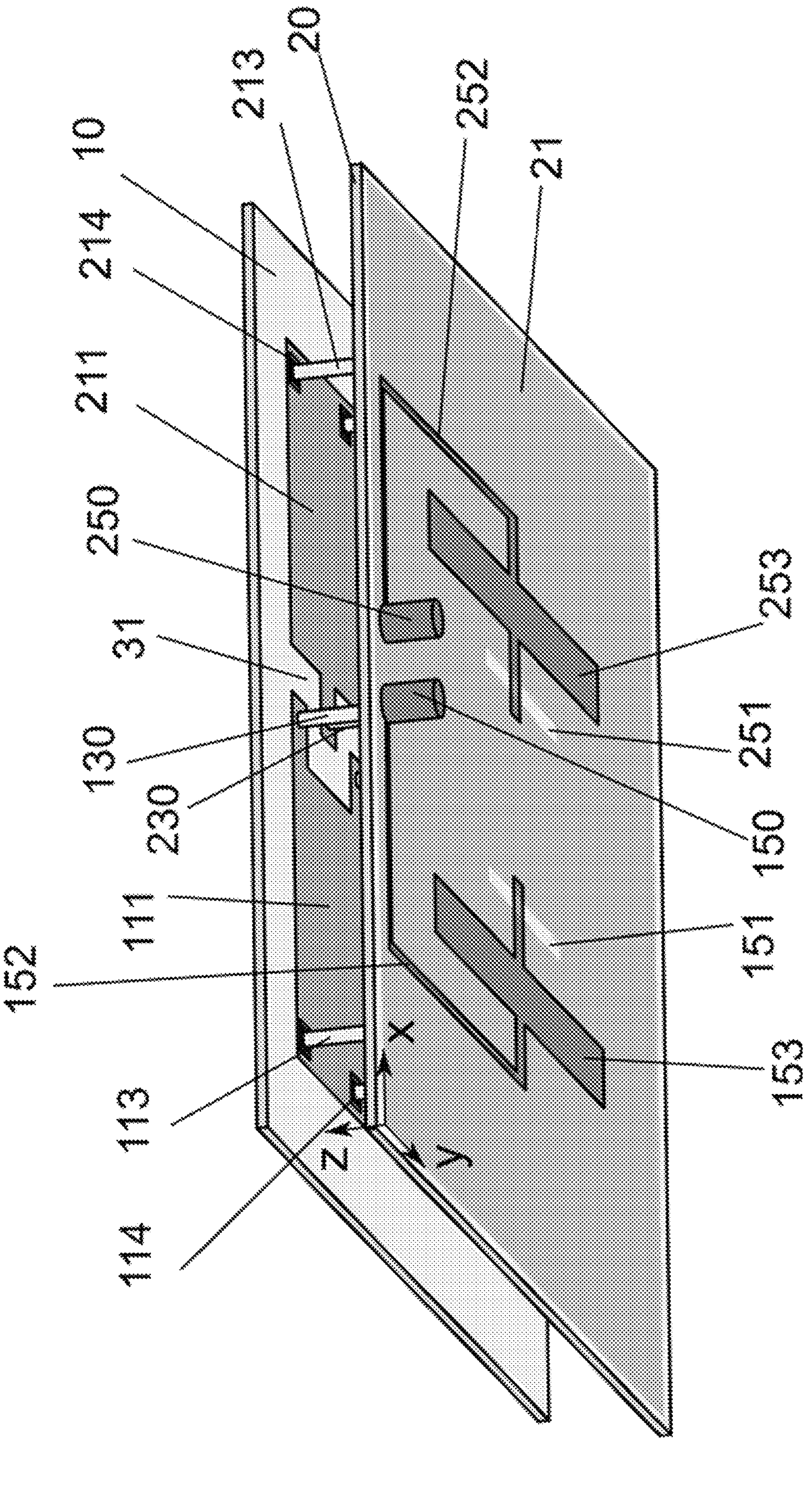
FIG. 3 shows a general view of the dual-fed rectangular patch antenna with capacitive loads and two aperture-coupled feeds.
Figure 5:
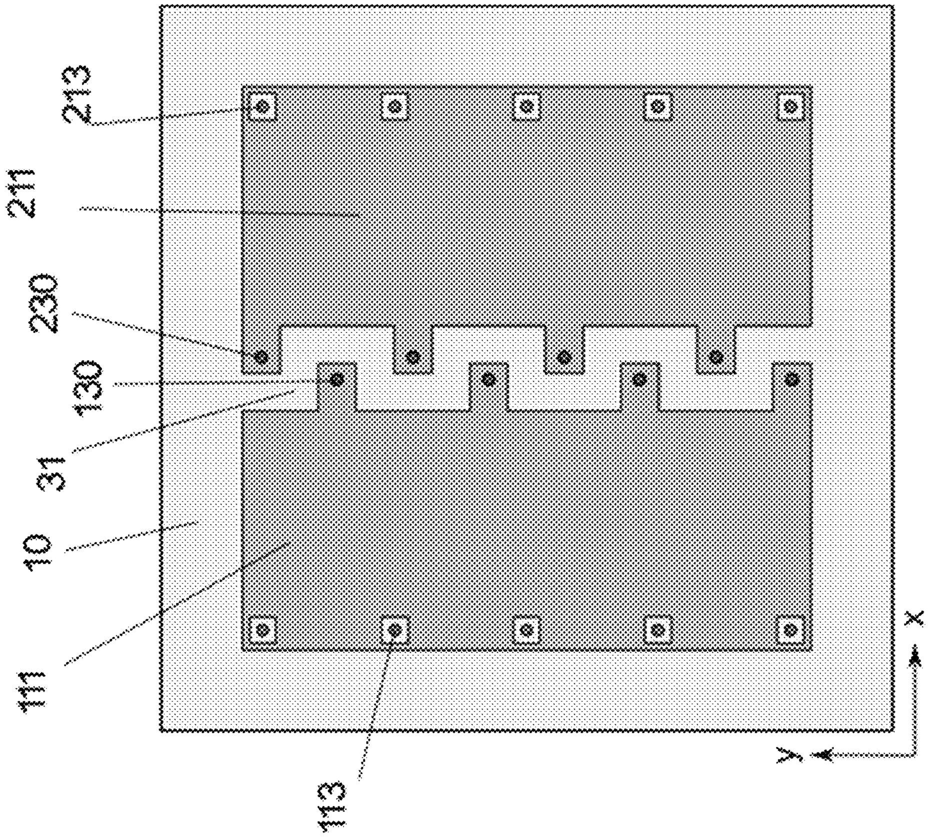
FIG. 5 shows a bottom view of the upper PCB of the rectangular patch antenna with visible half-sized plates separated by a meandered gap.
Figure 4:
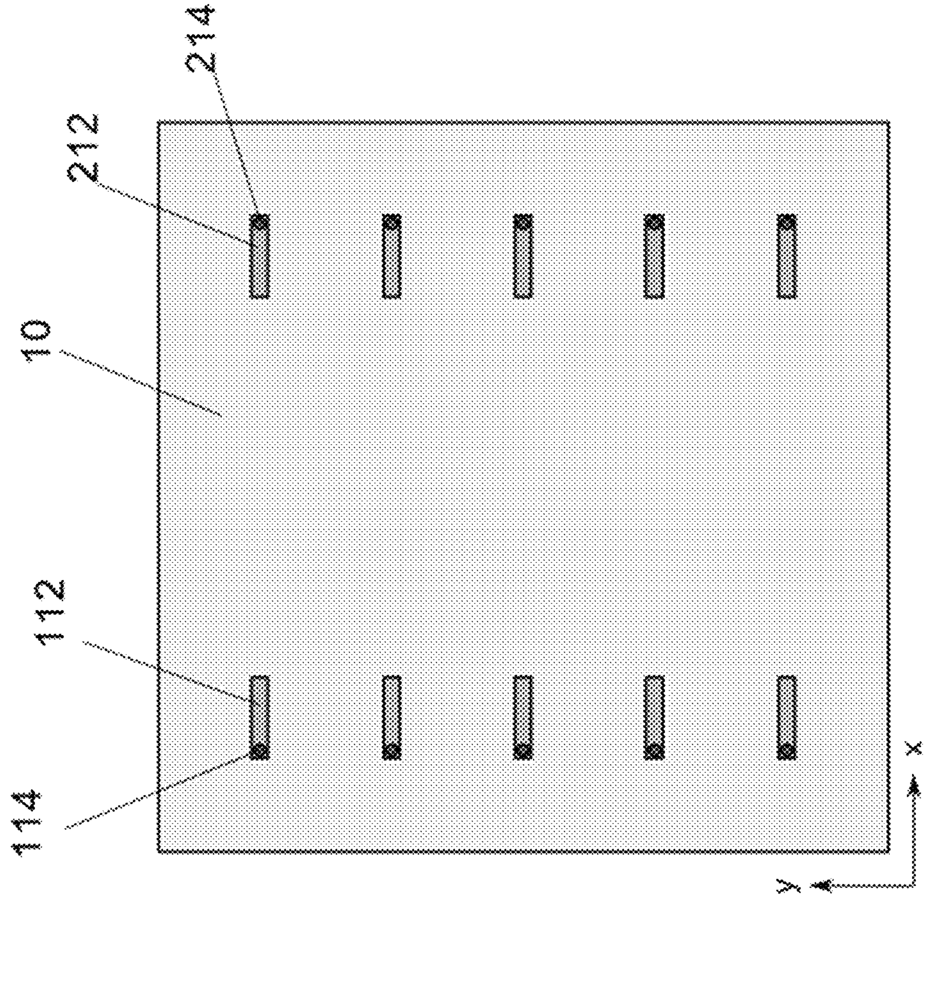
FIG. 4 shows a top view of the upper PCB of the rectangular patch antenna with visible printed metal strips of capacitive loads for tuning.
Figure 7:
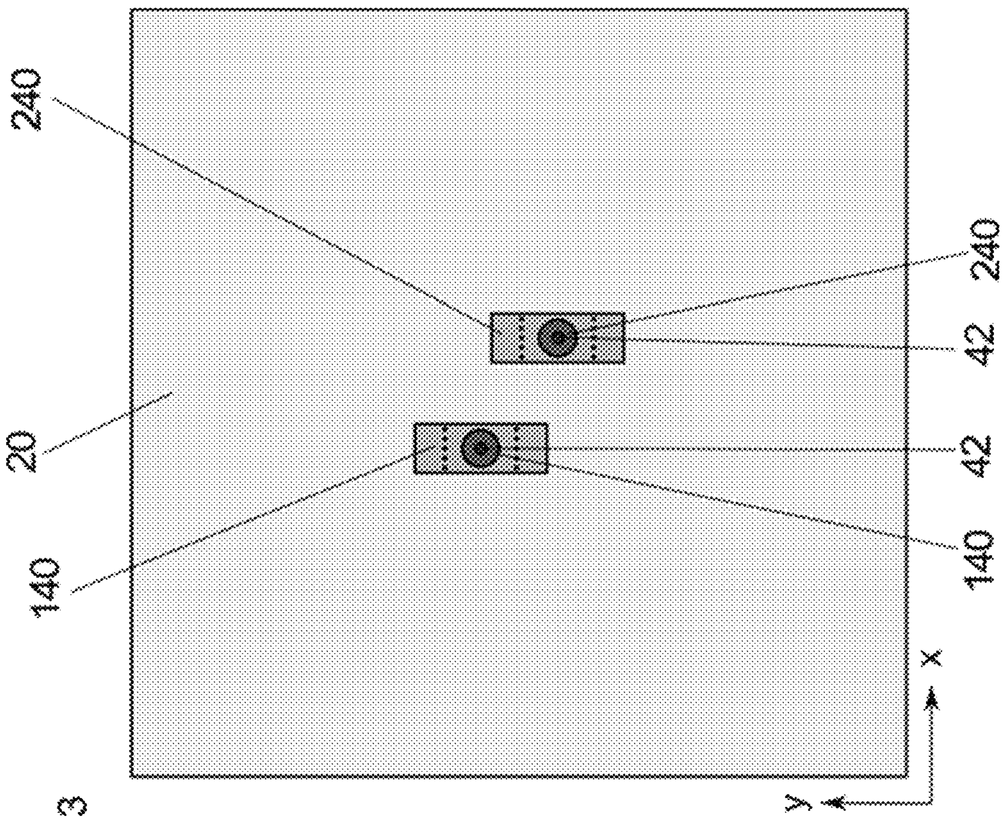
FIG. 7 shows a bottom view of the lower PCB of the rectangular patch antenna with the visible soldering plates for coaxial connectors for the variant with two coaxial feeds.
Figure 6:
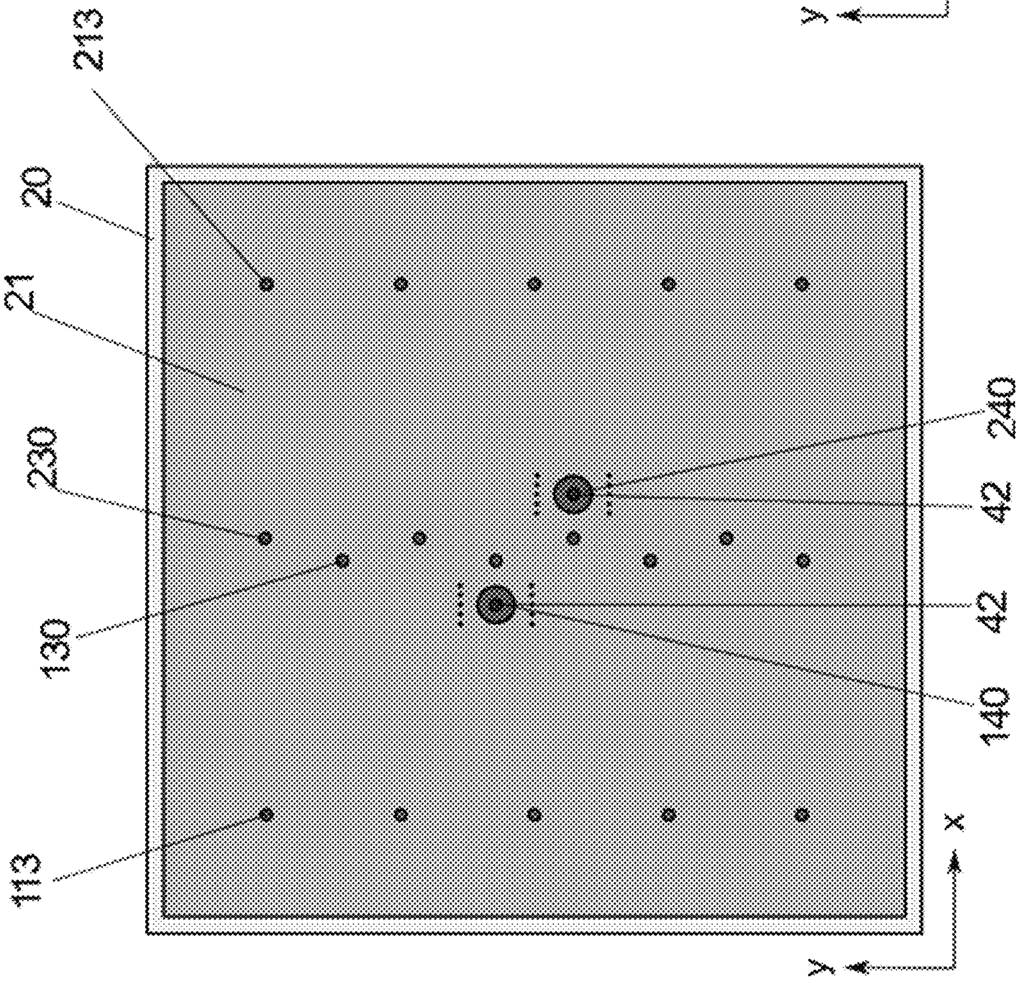
FIG. 6 shows a top view of the lower PCB of the rectangular patch antenna with the visible printed ground plane for the variant with two coaxial feeds.

General views of the proposed dual-fed patch antenna with rectangular half-patches in perspective are depicted in FIGS. 1-3, where FIGS. 1-2 show the variant with coaxial feeding, while FIG. 3 shows the variant with aperture-coupled feeding. In both variants, the geometry of the dual-fed radiator composed of two half-sized rectangular shorted plates is the same (essentially, mirror images of each other). The proposed dual-fed patch antenna contains two half-sized rectangular metal plates 111 and 211 placed above the common ground plane 21 operating as individual decoupled resonators. Due to the proposed decoupling structure, the two shorted (to the ground plane) plates together occupy the same size as a conventional (symmetric) rectangular full-sized patch resonator, i.e., a full-sized single-fed antenna. Both half-sized plates 111 and 211 are printed over the same dielectric substrate 10 and capacitively connected to the ground plane 21 through vertical periodic tuning pins 113 of resonator 1 and 213 of resonator 2 and series capacitive stubs 112 of resonator 1 and 212 of resonator 2.

Plates 111 and 211 are positioned on the bottom side of substrate 10, while stubs 112 and 212 are positioned on the top side of the same substrate. To connect tuning pins 113 and 213 to stubs 112 and 212 special via holes 114 and 214 are made in substrate 10. Stubs 112 of resonator 1 and 212 of resonator 2 serve as capacitive loads of the half-sized patch resonators placed at the radiating slots of the antenna. By adjusting their common length, one moves the resonant frequency to the target operational frequency. Both half-sized metal plates 111 and 211 are connected to ground plane 21 by periodic linear arrays of short-circuiting pins 130 and 230 correspondingly, each of the vertical short-circuiting pins 130 and 230 located at the interdigitated portions of the patches. A typical number of such "digits" of each plate 111, 211 is 4, generally between 4 and 10, given manufacturing tolerances and other production factors. The directions of linear arrays of short-circuiting pins 130 and 230 are parallel, while there is a shift between their axes in the direction parallel to E-plane (along X-axis according to FIG. 1).

To reach the isolation of better than −15 dB, the optimal number of short-circuiting pins per patch ranges from 4 to 10. Since the length of the linear array is equal to the length of the radiative slot of the patches (which is selected based on well-known approaches), the number of short-circuiting pins determines their period i.e., the distance between adjacent pins within linear arrays 130 and 230. The minimal width of the meandered gap is set by technological capabilities of typical printed-circuit board manufacturing process and normally equals to 0.1-0.2 mm. The maximum width of the same gap is one third of the period of pins in a linear array. The optimal gap width is found during numerical simulations with the goal of the lowest transmission coefficient between ports 140 and 240 at the operational frequency.

Also, there is a shift in parallel to the H-plane (along Y-axis according to FIG. 1) equal to a half-period of wires in the periodic linear arrays. Thanks to this H-plane half-period shift, the E-plane shift can be positive or negative (zero shift corresponds to the axes of both linear arrays 130 and 230 aligned). This shift is responsible for the frequency of decoupling. To avoid the electric connection between plates 111 and 211, gap 31 between them is introduced, which has meandered (zig-zag) shape for small positive, zero, and negative E-plane shifts. The width of gap 31 is responsible for the isolation level achievable at the decoupling frequency.

Figure 9:
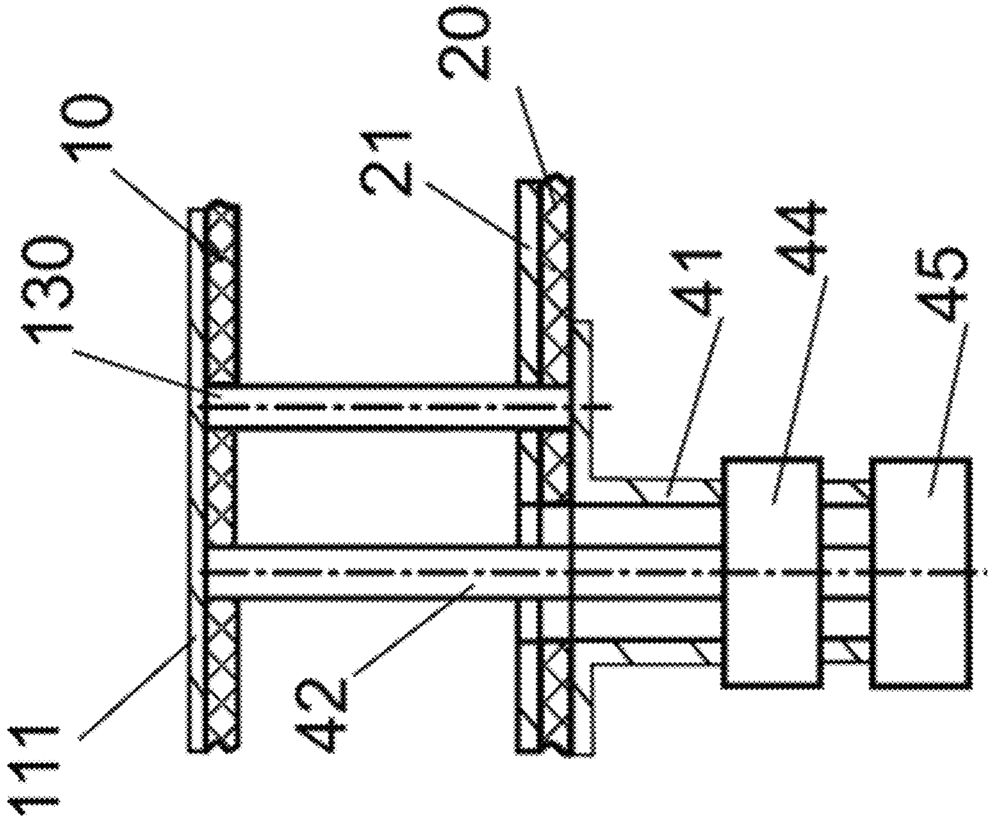
FIGS. 8-9 show implementations of the coaxial feed.
Figure 8:
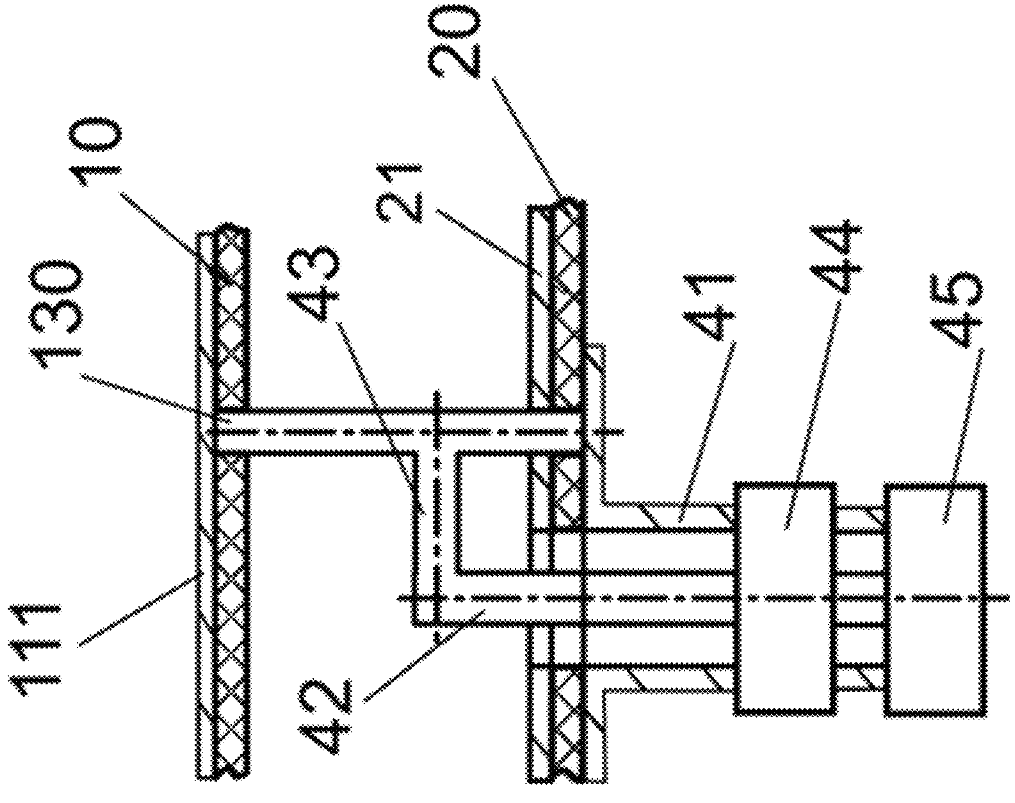

In the first variant of feeding, half-sized resonators 1 and 2 are fed with two identical coaxial probes 140 and 240. Two possible geometries of a coaxial probe for resonator 1 are illustrated in FIGS. 8 and 9. The coaxial probe consists of vertical wire 42 connected to the central core of coaxial line 41. Line 41 connects the resonator to electronic circuit 45 through an optional matching circuit 44. In the version shown in FIG. 8, wire 42 is bent at a certain height at a right corner and its horizontal continuation 43 is connected to one of the short-circuiting pins of linear array 130 shorting corresponding half-sized plate 111 to ground plane 21. In the version shown in FIG. 9, wire 42 is straight and connected directly to half-sized plate 111.

The version shown in FIG. 8 is necessary to match a high input impedance at the resonance frequency if it is not achieved by adjusting the probe position within the resonator. The version shown in FIG. 9 is suitable for a moderate input impedance, which can be matched only by adjusting the probe position.

Both radiators have common ground plane 21, which in the cases illustrated in FIGS. 1-3 is a rectangular metal plate printed on the top side of dielectric substrate 20. This printed configuration is suitable for both coaxial and aperture-coupled feeding as it allows embedding all components of corresponding feeding networks. Especially for aperture-coupled feeding, the bottom side of the substrate carries microstrip feeding lines. However, for coaxial feeding, ground plane 21 can be a standalone rectangular plate cut from a metal sheet without any dielectric substrate. The ground plane can be also square of circular with a size larger than an overall size of the two half-sized patches together, as shown in FIG. 17.

Figure 11:
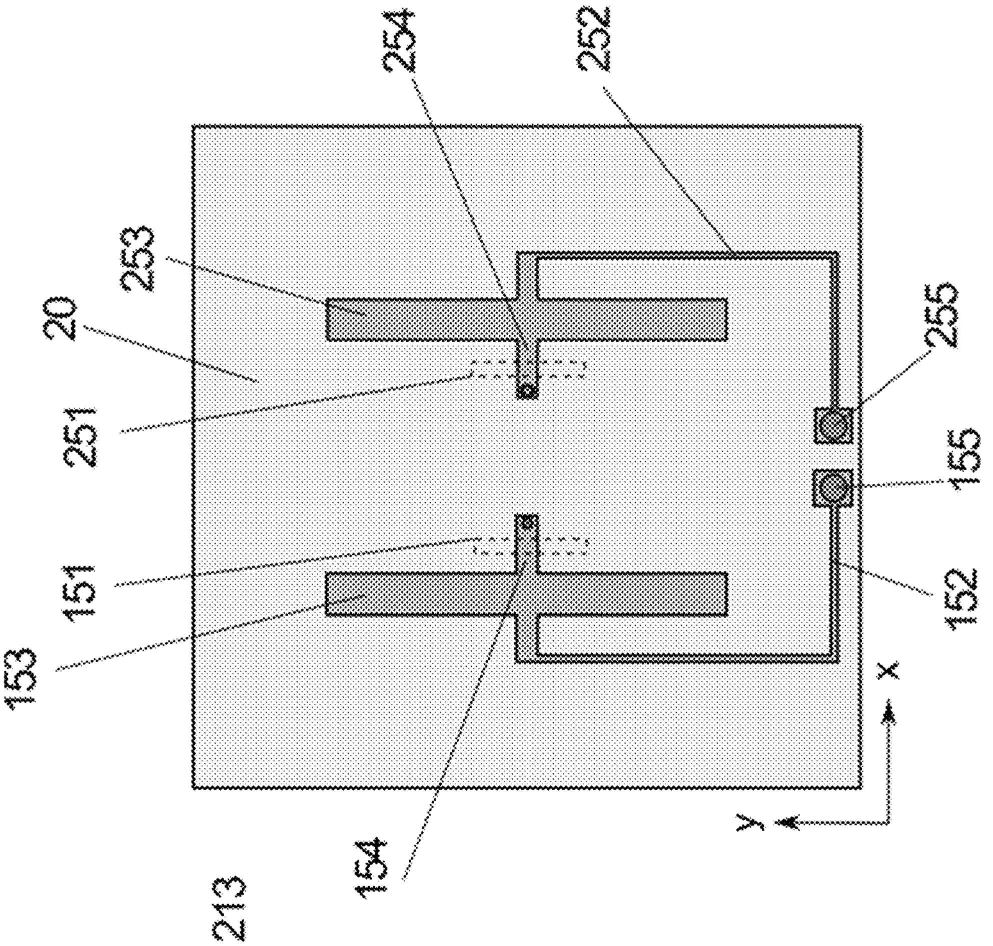
FIG. 11 shows a bottom view of lower PCB of the rectangular patch antenna with a microstrip feeding and matching network visible for the variant with aperture-coupled feeds.
Figure 10:
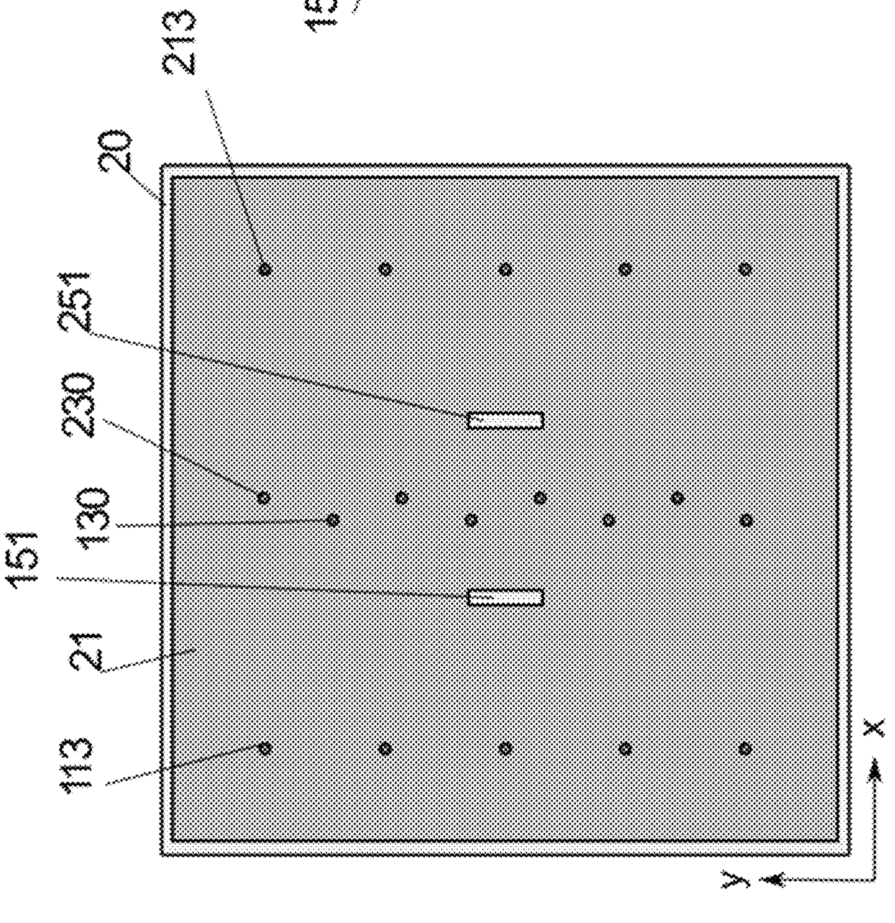
FIG. 10 shows a top view of the lower PCB of the rectangular patch antenna with the visible printed ground plane for the variant with aperture-coupled feeds.

In the second configuration, aperture-coupled feeding is implemented, as shown in FIGS. 3, 10, and 11. The example shown in FIG. 3 has rectangular shape of the half-sized patches. Two symmetric slots, i.e., slot 151 feeding resonator 1 and slot 251 feeding resonator 2 are cut out from ground plane 21 on the top side of substrate 20. Microstrip transmission lines 154 and 254 are made on the bottom side of substrate 20 crossing the axes of slots 151 and 251 correspondingly. To compensate for the reactance of the slots, symmetrical parallel open-ended microstrip stubs 153 and 253 are connected to lines 154 and 254 correspondingly, just next to slots 151 and 251. Then, to transform the real input impedance for impedance matching, two quarter-wave microstrip transformers 152 and 252 are introduced between lines 154 and 254 and microstrip-to-coaxial connectors 155 and 255.

In both proposed variants of feeding of the patch antenna, it is possible to improve the decoupling between two feeds by varying the E-plane shift between linear arrays of short-circuiting pins 130 and 230 (responsible for decoupling frequency) and widths of meandered gap 31 between half-sized plates 111 and 211 (responsible for the level of isolation at the decoupling frequency). The principle of the proposed decoupling method of patch resonators 1 and 2 relies on mutual cancellation between capacitive and inductive coupling to be achieved at the resonance frequency of the resonators, by adjusting the E-plane shift and the width of the meandered gap. This decoupling regime corresponds to CM and DM excitation in equal proportion, so that when the first resonator is excited, there is negligible field induced in the second one and vice versa. In contrast to conventional art, the proposed decoupling structure that uses shorting linear arrays of short-circuiting pins 130 and 230 and the meandered gap 31 allows to place two decoupled half-size shorted patches within the size of a conventional symmetrical patch antenna.

The two half-sized patch radiators separated by the meander-shaped gap and forming an interdigitated structure can alternatively have semi-circular shapes of their edges on an opposite side of each radiator from the digits, as shown in FIG. 17. Both above mentioned feeding methods apply to both circular and rectangular dual-feed antennas (as well as to other shapes of the radiator). In contrast to the examples of rectangular antennas shown in FIGS. 1-3 and having discrete capacitive loads, the example of the circular antenna shown in FIG. 17 has a dielectric substrate between the patches and the ground plane, whose permittivity is responsible for tuning to the resonant frequency for both half-sized semi-circular patches.

The procedure for designing the proposed dual-fed patch antenna is as follows.

Step 1 (tuning): Both half-sized patch resonators 1 and 2 should be tuned to the target operational frequency by varying the length of capacitive strips 112 and 212, correspondingly. This length is proportional to the capacitance of the loads that connect patch plates 111 and 112 to ground 21 at the radiative slots of the antenna. The resonant frequency is the same for both resonators and inversely proportional to the square root of load capacitance and to the square root of the length of strips 112 and 212. For small electrical size of the entire antenna, the required capacitance is inversely proportional to the total length of both plates 111 and 211. The load capacitance can be increased also proportionally to the dielectric permittivity of substrate 10, which facilitates tuning to lower frequencies for the given size of the dual-fed antenna. Alternatively, instead of using discrete capacitive strips 112 and 212, the resonant frequency can be controlled by the permittivity of substrate 10, which can partially or completely fill the space between plates 111, 211 and ground plane 21. In the case with no discreet capacitive loads, where substrate 10 entirely fills the space, the resonant frequency of resonators 1 and 2 is inversely proportional to the dielectric permittivity. The resonant frequency is controlled by tracking the maximum of the real part of the input impedance at both symmetric ports of the antenna.

Step 2 (matching): the distances from feeds to the center of the antenna should be the same and chosen to have the best possible impedance matching at the resonant frequency set at the previous step and satisfy design constraints, such as accuracy and manufacturing limitations of PCB layouts. This approach is conventional in the art and applies to any patch antennas. In case of the proposed dual-fed patch antenna, this method is suitable for both variants of feeding.

Thus, for coaxial feeding, the positions of symmetrical probes 140 and 240 should be adjusted, while for the aperture-coupled feeding, the positions of slots 151 and 251 should be varied. The goal is to obtain a required real impedance at the previously tuned resonant frequency. If not possible, additionally matching networks 44 can be connected to the corresponding feeds. The design of the matching networks is done according to the available art and comprise lumped elements or an L-, Pi-, or T-type circuit, or corresponding stubs, or impedance transformers (distributed circuits). The transmission lines connected to the feeds can be coaxial or microstrip.

In the examples given in FIGS. 1-2, and FIG. 17 both half-sized patch resonators are fed directly using coaxial cables connected to coaxial feeds 140 and 240. In this case, the coaxial feeding variant should be used. Alternatively, to connect the resonators to the electronics printed on the bottom side of the same substrate 20 as for ground plane 21, the aperture-coupled feeding is more convenient. In this case, the parallel stubs 153 and 253 as well as impedance transformers 152 and 252 conveniently serve as additional elements for impedance matching. The operational bandwidth of impedance matching for the given E-plane dimension of the antenna grows with the height of patch plates 111 and 211 over the ground, the length of the radiating slots (H-plane dimension of the antenna for the rectangular shape and length of semi-circular edges of the patches for the circular shape) and reduces with load capacitance, i.e., with the length of capacitive strips 112 and 212, which is a common behavior for any patch antennas with capacitive loads. When the frequency is tuned using the permittivity of substrate 10 mostly or completely filling the space between plates 111, 211 and ground plane 21 (as in the example of FIG. 17), the bandwidth reduces with growing relative permittivity of substrate 10.

Step 3 (decoupling): as tuning and matching of both half-sized patch resonators is achieved, the antenna ports can be decoupled as follows. The E-plane shift between linear arrays 130 and 230 of short-circuiting pins is to be adjusted with the goal to obtain a local minimum on the frequency dependence of the transmission coefficient between the probes (S12) at the operational (resonant) frequency. Depending on the height of the patch plates 111 and 211 and their dimensions, the optimal E-plane shift can be positive (two patch plates 111 and 211 overlap) or negative (two patch plates 111 and 211 are separate).

For a zero E-plane shift the axes of linear arrays 130 and 230 align. To avoid the connection between plates 111 and 211 for any E-plane shift of linear arrays 130 and 230, meandered gap 31 is introduced. The width of this slot is the second parameter that is responsible for the achievable level of S12 at the decoupling frequency. Therefore, by finding the optimal values of the two parameters (E-plane shift of linear arrays 130 and 230 as well as the width of slot 31), one can minimize mutual coupling between ports of resonators 1 and 2 at the operational frequency keeping tuning and matching to levels of better than −15 dB. The same result could be achieved with a conventional method of splitting the full-sized symmetric patch into two halves with a mirror-symmetric metal shield, but its height over the ground plane must be at least 50 mm for 800 MHZ. Therefore, the proposed method improves the compactness of the dual-fed antenna and makes it low-profile. The proposed method applies to rectangular, circular and other mirror-symmetric patch shapes.

The S-parameters shown in FIG. 11 and radiation patterns shown in FIGS. 12-14 are the numerically calculated properties of the proposed antenna in the first configuration (according to FIGS. 1-2) with the overall size of two half-sized rectangular plates of 70 mm×70 mm, and height 10 mm above the ground plane of the size 90 mm×90 mm. The plates were shorted to the ground by two linear arrays of 4 short-circuiting pins each where the pins were identical cylindrical conductors of the diameter of 1 mm. The substrate was made of 1-mm thick Arlon AD255C material with relative dielectric permittivity of 2.55 and dielectric loss tangent of 0.0014. To tune this dual-fed antenna to the target operational frequency $f_0$=800 MHz (corresponding to LTE downlink band 20), the plates were connected with 5 vertical tuning pins at the radiating slots through capacitive loads implemented as printed strips of the width 2 mm, and their length was set to 10 mm for tuning.

The demonstrated example of the rectangular antenna had the coaxial variant of feeding. The variant of the coaxial probe corresponds to FIG. 8 with the height of the vertical part of the probe equal to 5 mm and the horizontal bent part equal to 5 mm (similarly for both feeds). This corresponds to matching to 50 Ohm. To obtain decoupling at 800 MHZ the E-plane mutual shift between two linear arrays of short-circuiting pins 130 and 230 was set to −2.8 mm, and the level of S12 at the same frequency was minimized to less than −30 dB by setting the width of meandered gap 31 to 4.7 mm.

The S-parameters shown in FIG. 16 are the numerically calculated properties of the proposed antenna with rectangular half-sized plates and an increased height in the second variant of feeding (with two aperture-coupled feeds according to FIG. 3). The demonstrated example has the same overall size of two half-sized plates and the ground plane size as the previous example, but the height is increased to 20 mm for broadening the operational frequency band (defined as the range of frequencies in which scattering parameters S11 and S12 are both lower than −10 dB). The plates were shorted to the ground by two linear arrays of 4 short-circuiting pins each where the pins were identical cylindrical conductors of the diameter of 1 mm. The substrate was made of 1-mm thick Arlon AD255C material with a relative dielectric permittivity of 2.55 and dielectric loss tangent of 0.0014. To tune this dual-fed antenna to the target operational frequency $f_0$=800 MHZ (corresponding to LTE downlink band 20), the plates were connected with 5 vertical tuning pins at the radiating slots through capacitive loads implemented as printed strips of the width 2 mm, and their length was set to 2 mm for tuning.

The aperture-coupled feeds include microstrip transmission lines with a width of 2.83 mm, open-ended microstrip stubs with a width of 5.66 mm and length of 27 mm, slots with a width of 2 mm and a length of 30 mm. This corresponds to matching to 50 Ohm. Do design such an aperture-coupled feed one can use the methods known in the art. To obtain decoupling at 800 MHZ the E-plane mutual shift between two linear arrays short-circuiting pins 130 and 230 was set to −1 mm, and the level of S12 at the same frequency was minimized to less than −20 dB by setting the width of meandered gap 31 to 4.7 mm.

The S-parameters shown in FIG. 18 are the numerically calculated properties of the proposed antenna with semi-circular shape of two half-sized plates and a circular ground plane, where the plates have a radius of 17 mm and are placed at a height of 5 mm above the circular ground plane with a radius of 30 mm. The plates were shorted to the ground by two linear arrays of 4 short-circuiting pins each where the pins were identical cylindrical conductors of the diameter of 1 mm. To tune this dual-fed antenna to the target operational frequency $f_0$=2.4 GHZ (corresponding to one of Wi-Fi bands), the relative dielectric permittivity of the substrate filling the entire cylindrical space between the plates and the ground was set to 4.

The demonstrated example of the antenna with semi-circular half-sized plates had the coaxial variant of feeding. The variant of the coaxial probe used in this example corresponds to FIG. 9 with an additional L-type matching circuit composed of two lumped capacitors to match the antenna to 50 Ohm. The design of the matching circuit is done using the methods known in the art. To obtain decoupling at $f_0$=2.4 GHz the E-plane mutual shift between two linear arrays of short-circuiting pins 130 and 230 was set to −3 mm, and the level of S12 at the same frequency was minimized to less than −20 dB by setting the width of meandered gap 31 to 2.3 mm.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A dual-fed antenna comprising:
- a ground plane;
- first and second metal patch radiators positioned over the ground plane, wherein the first and second metal patch radiators are mirror images of each other;
- the first and second metal patch radiators separated by a meander-shaped gap, thereby forming an interdigitated structure, with each radiator having at least three digits;
- each digit being shorted to the ground plane using a corresponding short-circuiting metal pin.

2. The dual-fed antenna of claim 1, further comprising a coaxial connector which central conductor is connected to each radiator through a hole in the ground plane with a metal rod.

3. The dual-fed antenna of claim 2, further comprising matching networks connected to the coaxial connection at both ports through holes in the ground plane and transmission-line sections.

4. The dual-fed antenna of claim 2, wherein each coaxial connector includes a bent wire connected to the central conductor of a coaxial with a vertical part shorter than a height of the corresponding patch radiator above the ground plane and a horizontal portion connected to one of the metal pins of the corresponding patch radiator.

5. The dual-fed antenna of claim 1, wherein each radiator further has a plurality of tuning pins located on an opposite side of the radiator from the digits.

6. The dual-fed antenna of claim 5, wherein the tuning pins are metal cylinders with rectangular, square, or triangular cross-section.

7. The dual-fed antenna of claim 5, wherein the tuning pins are metal screws, while their cross-section size is smaller than the length of the tuning pins.

8. The dual-fed antenna of claim 5, wherein each tuning pin has a capacitive load.

9. The dual-fed antenna of claim 8, wherein the capacitive loads are implemented as separate plates cut from a metal sheet connected to the ground plane with the tuning pins but isolated from the radiators with air or with dielectric layers.

10. The dual-fed antenna of claim 8, wherein the capacitive loads are implemented as separate plates cut from a metal sheet connected to the radiators with the tuning pins but isolated from the ground plane with air or with dielectric layers.

11. The dual-fed antenna of claim 8, wherein the capacitive loads contain lumped capacitive elements.

12. The dual-fed antenna of claim 8, wherein the lumped capacitive elements include SMD capacitors or varactor diodes.

13. The dual-fed antenna of claim 8, wherein the capacitive loads include high-permittivity metal bricks located on an opposite side of each radiator from the digits.

14. The dual-fed antenna of claim 8, wherein the capacitive loads are implemented as metal strips or plates printed on the opposite side of the same substrate with the patch radiators.

15. The dual-fed antenna of claim 1, wherein a dielectric plate is located between the ground plane and the patch radiators, and the short-circuiting pins go through holes in the dielectric plate.

16. The dual-fed antenna of claim 1, wherein the short-circuiting pins of each radiator form a periodic linear array, and there is a shift between axes of the linear arrays in a direction perpendicular to the periodic linear arrays.

17. The dual-fed antenna of claim 1, further comprising a slot in the ground plane below each radiator, wherein each slot is fed with a section of a microstrip transmission line.

18. The dual-fed antenna of claim 17, further comprising a microstrip-line matching network connected between each slot and the input of the corresponding microstrip transmission line.

19. The dual-fed antenna of claim 1, further comprising a slot on each patch radiator fed with a corresponding section of a microstrip transmission line.

20. The dual-fed antenna of claim 19, further comprising a microstrip-line matching network connected between each slot and the input of the corresponding microstrip transmission line.

21. The dual-fed antenna of claim 1, wherein the short-circuiting pins are metal cylinders with rectangular, square, or triangle cross-section.

22. The dual-fed antenna of claim 1, wherein the short-circuiting pins are metal screws, while their cross-section size is smaller than a length of the metal pins.

23. The dual-fed antenna of claim 1, where the short-circuiting pins are thin strips having a width smaller than a period of the linear arrays.

24. The dual-fed antenna of claim 1, where the first and second metal patch radiators forming an interdigitated structure have straight shapes of edges on an opposite side of each radiator from the digits.

25. The dual-fed antenna of claim 1, where the first and second metal patch radiators forming an interdigitated structure have semi-circular shapes of edges on an opposite side of each radiator from the digits.

26. The dual-fed antenna of claim 1, where the first and second metal patch radiators forming an interdigitated structure have semi-elliptical shapes of edges on an opposite side of each radiator from the digits.

27. The dual-fed antenna of claim 1, where the first and second metal patch radiators forming an interdigitated structure have polygonal shapes of edges on an opposite side of each radiator from the digits.

28. The dual-fed antenna of claim 1, wherein the patch radiators are printed on a dielectric substrate.

* * * * *